Nov. 27, 1962
A. M. WARN
3,065,726
SAFETY ALARM SIGNALS FOR VEHICLES
Filed Dec. 5, 1960
2 Sheets-Sheet 1
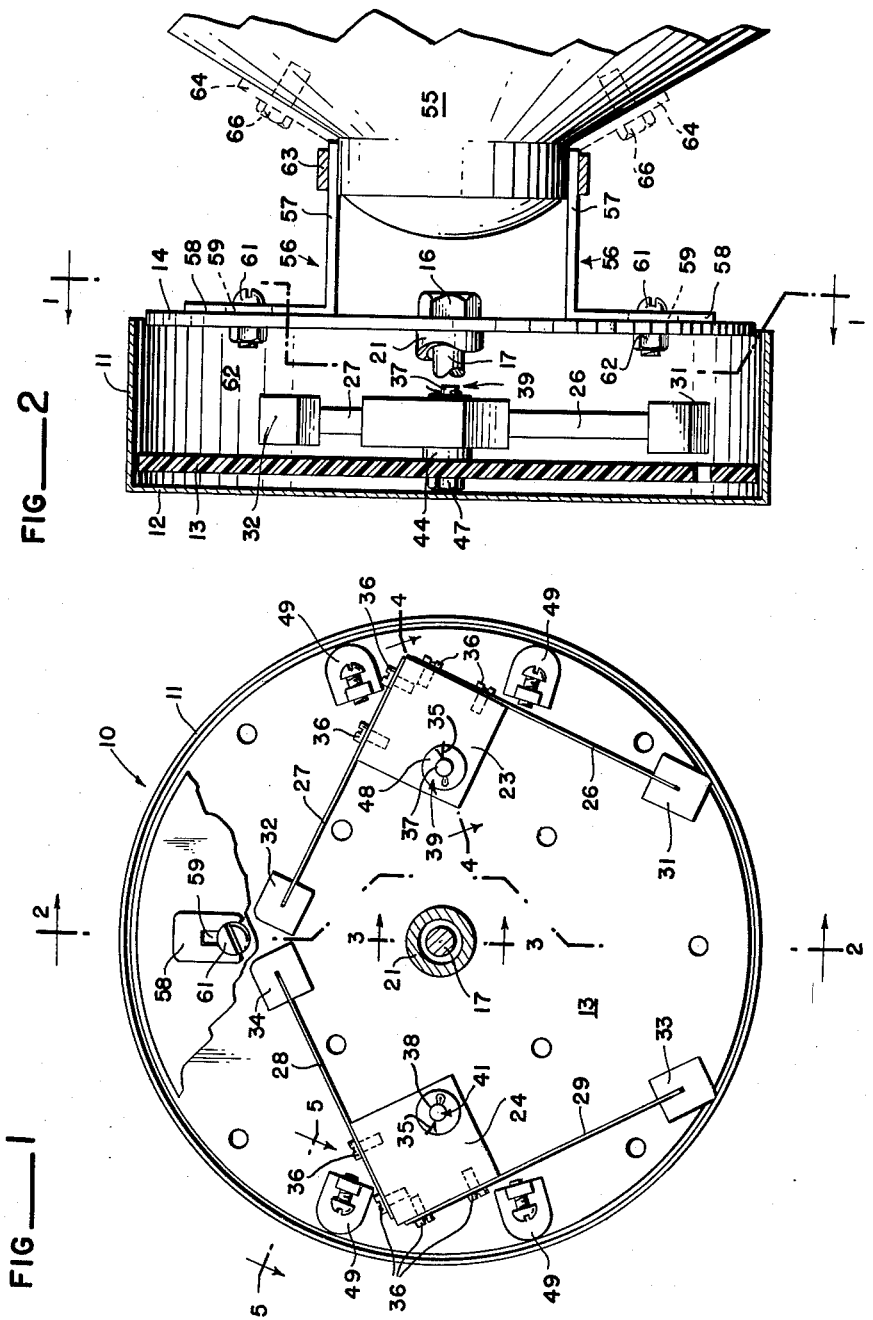
INVENTOR.
ARTHUR M. WARN
BY
ATTORNEY Nov. 27, 1962 A. M. WARN 3,065,726
SAFETY ALARM SIGNALS FOR VEHICLES
Filed Dec. 5, 1960 2 Sheets-Sheet 2

INVENTOR.
ARTHUR M. WARN
BY
ATTORNEY 3,065,726
SAFETY ALARM SIGNALS FOR VEHICLES
Arthur M. Warn, 18221 Pacific Highway S., Seattle 88, Wash.
Filed Dec. 5, 1960, Ser. No. 73,708
5 Claims. (Cl. 116—60)

This invention relates to new and useful safety signalling devices for vehicles.

Broadly this invention provides a safety alarm signal for vehicles such as trucks, tractors, fork-lift trucks and the like which are operated in areas in which there are people who may be injured. For example, loading and unloading docks and platforms, warehouses, stockrooms and the like require the use of such vehicles where people are likely to be moving about afoot. This device, attached to the vehicle wheel hub will provide a warning to persons nearby who may be engaged in other activity and whose attention may be diverted away from the dangers of a vehicle moving about either carrying or pushing or pulling a heavy load. Similarly this device is designed to warn individuals whom the driver of the vehicle may have failed to see.

More specifically this invention has as its object to provide vehicles with a safety alarm signal which produces a continuous audible alarm in either direction of travel of the vehicle.

Another object is the provision of a signalling device of the character described which is entirely self-contained, requiring no outside electrical, mechanical, hydraulic or other power or motive connections, and which, despite the fact that it contains movable parts requires only a single rigid attachment to the vehicle structure. Generally the motive power is provided by the relative movement between certain parts which rotate with a wheel of the vehicle about a common axis. Within the signal device are parts revolving about the said common axis but which rotate within a limited range about a pivot point of their own and which when actuated by gravity serve to strike the alarm bell and cause the alarm sound.

Another object of this invention is to provide a safety alarm signal for vehicles which is simple and economical in construction, efficient and dependable in operation, and readily adaptable to any type of vehicle moving on wheels.

These, together with other objects and advantages which will become subsequently apparent, reside in the details of construction and operation as more fully hereinafter described and claimed, reference being had to the accompanying drawings, forming a part hereof, wherein like numerals refer to like parts throughout, and in which:

FIGURE 1 is a rear elevational view taken along the line 1—1 in FIGURE 2;

FIGURE 2 is a side elevational view of the same device taken along the line 2—2 of FIGURE 1 and in which only the bell and the backing plate are sectioned;

FIGURE 3 is a partial section view of the central support taken along line 3—3 of FIGURE 1;

FIGURE 4 is a partial section view of the support for the striker weight taken along the line 4—4 of FIGURE 1 and in which the bell wall 11 has been omitted for clarity of illustration;

FIGURE 5 is a partial section and elevational view of the adjustable stops taken along line 5—5 of FIGURE 1; and FIGURES 6 and 7 are diagrammatic views illustrating the operation of this device.

Referring to the drawings in detail, particularly FIGS. 1 and 3, it will be observed that the illustrated embodiment of the invention comprises a sounding bell 10 in the form of a shallow steel cylinder closed at one end and open at the other end. However, the well may also be of other shapes. Furthermore, the bell may be made of metals other than steel. Comprising bell 10 for the purposes of this description are side wall 11 and end wall 12. Bell 10 is adapted to be mounted on shaft 17 of bolt 16 by virtue of its aperture 22. Within bell 10 and in axially spaced relation to end wall 12, is a plastic backing plate or disc 13. The periphery of said disc 13 is in radially spaced relation to side wall 11. The purpose of disc 13 will be discussed more fully below. It will be seen that between end wall 12 and disc 13 is a spacer or washer or bushing 19 formed of metal or plastic or other synthetic composition, the purpose of said spacer 19 being to maintain the spaced relation between wall 12 and disc 13. Disc 13 by reason of its aperture 15 is positioned on shaft 17 in the same manner in which bell 10 is positioned thereon.

Spacer sleeve 21 is received on shaft 17 with one end of said sleeve abutting disc 13 and the other end abutting supporting plate 14 more fully discussed hereinafter. It may be seen that when nut 18 is tightened on shaft 17 of bolt 16 that those elements described become rigidly attached to said shaft and each other and that such elements taken together comprise a single, rigid structural unit.

Referring now to FIGS. 1, 2 and 5 it will be observed that mounted on disc 13 at diametrically opposed points slightly greater than midway from shaft 17 to side wall 11 are shafts or studs 39 and 41. With particular reference to FIG. 4 it may be seen that stud 39, to which stud 41 is identical and therefore not described, has a larger upper portion and a smaller lower portion which together form shoulder 46. The lower end of lower portion 43 is threaded to receive nut 47. A washer 44 fits only the lower portion 43 and abuts firmly against shoulder 46. When the stud 39 is inserted through washer 44 and aperture 45 in disc 13 and nut 47 is tightened it will be understood that stud 39 thereby becomes securely attached to disc 13. Note that both studs 39 and 41 are provided with small holes at the outer end of the large portion in order to receive small cotter pins or the like.

Weights or mounting hubs or striker arm supports 23 and 24 are provided with apertures 37 and 38 respectively for the purpose of being pivotally received on the studs 39 and 41. The apertures 37 and 38 in said weights, hereinafter called "hubs," are drilled off center near one corner so that the hubs are in effect mounted eccentrically on the studs 39 and 41 the greater mass of the hub being located between the pivot point and side wall 11. The hubs are square when viewed from a front or rear elevational position but are rectangular when viewed from a side elevational position or from either plan view. Hub 23 has attached to it flexible striker arms 26 and 27 in the manner shown in FIG. 1 by screws 36. Striker arms 26 and 27 are provided at the free end with clappers or striker heads 31 and 32. Similarly flexible striker arms 28 and 29 have pressed thereon clappers or striker heads 33 and 34 and said arms are attached to hub 24 by screws 36. By reference to the drawing it will be noted that the flexible striker arms extend out from the hub at right angles to each other from the corner diagonally opposite to the corner nearest the pivot point. The striker arms extend outwardly from the hub little more than the length of one side of the square. Thus, the striker arms and heads on either hub never protrude beyond the halfcircle to which the hub itself is confined so as to interfere with or obstruct the arms and heads of the other hub. Note that the distance between a line drawn through the centers of the striker heads 31 and 32 on hub 23 and a line parallel thereto taken through the axis of stud 39 is less than the distance from the axis of stud 39 to side wall 11. As is shown in FIG. 4 a washer 48 is placed between hub 23 and a cotter pin 35 inserted through a small hole (not numbered) in the end of stud 39. Thus, hub 23 besides being freely rotatable on the stud 39 is also permitted very restricted axial movement so that there is no danger of its binding to impair the operation of the device.

A few degrees above and below the diameter line running through the centers of the studs 39 and 41 and the axis of shaft 17 and located on the peripery of disc 13 are four adjustable stop members 49 (see FIGS. 1 and 5). Each stop is comprised of base member 51 and upstanding wall 52, said wall being of lesser width than base 51. Securing each stop 49 to disc 13 is screw 54. In each wall 52 is provided screw 53 which has as its function to adjust within a limited range the arc through which weights 23 and 24 are permitted to rotate. The stops 49 are so positioned that they contact the flexible striker arms at a point only slightly distant from the body of the hub itself when the arm swings toward the stop.

In FIG. 2 is shown supporting plate 14 securely attached, as described above, to shaft 17 of bolt 16. In addition to its support function plate 14 also serves to protect the operation of moving parts within bell 10 from being impaired and obstructed with grease and dirt and other deleterious matter.

In order to support the invention on the wheel hub 55 of the particular vehicle it is necessary to fashion three or four brackets, identical to brackets 56 shown in FIG. 2 for illustrative purposes, and spaced at either 90° or 120° intervals as may be determined necessary by a person skilled in the art. Brackets 56 have legs 57 and at right angles thereto legs 58. Legs 58 are provided with slots 59 for the purpose of permitting precise adjustment of the invention on the wheel hub 55. It should be noted that the axes of bell 10 and shaft 17 should be as nearly possible coaxial with the axis of hub 55. Securing brackets 56 to the plate 14 are bolts 61 and nuts 62. Assembled as described this invention forms a rigid unit ready for attachment to the vehicle wheel hub.

Legs 57 may be secured to hub 55 by strapping said legs thereto with steel strap 63 having an appropriate tightening or cinching mechanism (not shown). Alternatively the brackets 56 may be designed so that third legs, such as legs 64 shown in dotted lines in FIG. 2, would fit the contours of the wheel to be attached thereto by the use of bolts or screws 66.

*Operation*

It may readily be seen that as the vehicle travels in either direction the operation of the safety alarm signal is the same. FIG. 1 is used to show a beginning reference position of zero degrees as the alarm signal rotates. In FIG. 1 striker heads 31 and 33 are in contact with wall 11 of bell 10 and heads 32 and 34 are out of contact. For the purpose of illustration the alarm signal is rotated counter clockwise. At a point indicating less than ninety degrees rotation, as shown in FIG. 6, head 31 begins to fall away from its contact with wall 11 while head 33 remains in contact with said wall. It would appear to be apparent that with hub 23 in the upper position there are no obstructions to its maintaining a balanced position once clapper 31 has fallen free of contact with wall 11, until there has been rotation of the entire unit of greater than ninety degrees but to a position of a few degrees less than that shown in FIG. 7. As clapper 32 comes into contact with wall 11 the first audible alarm signal is sounded. At nearly the same moment that clapper 32 strikes wall 11, clapper 34 attached to hub 24 has reached a position which causes it to overbalance the counterweight effect of clapper 33. Clapper 34 then falls striking wall 11 for the second audible alarm signal. At a full one-hundred-eighty degree rotation clappers 32 and 34 have assumed the same position that clappers 31 and 33 occupied at zero degrees. During the next one-hundred-eighty degrees of rotation and in precisely the same manner as first described audible signals three and four are produced. Thus it can be readily seen that through a single three-hundred-sixty degree rotation of the alarm two successive signals are sounded by a short interval of time after which two more successive signals are sounded. A similar operational sequence results where the direction of rotation is reversed.

The foregoing is considered as illustrative only of the principle of this invention. It is contemplated that this invention also may be used on vehicles which run on tracks and on machinery such as gears and other wheels. In short this invention has application to most any type of body which rotates, the turning of which should be accompanied by a safety alarm signal. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicular signal alarm for sounding a continuous audible warning of wheel rotation in either direction of wheel travel, comprising:
   (a) a shaft for coaxial rotation with a wheel;
   (b) a bell fixedly mounted on said shaft for rotation therewith;
   (c) a supporting disc fixedly mounted within said bell on said shaft for rotation therewith and axially and radially spaced from said bell;
   (d) a pair of studs attached to said disc, each stud offset from the axis of said bell;
   (e) a pair of flexible striker arms with striker heads attached thereto pivotally mounted on each of said studs with said striker heads in striking relation to said bell; and
   (f) means for limiting the pivot of said striker arms and heads to a predetermined range as said studs revolve about the axis of said bell.

2. A vehicular signal alarm for sounding a continuous audible warning of wheel rotation in either direction of wheel travel, comprising:
   (a) a shaft for coaxial rotation with a wheel;
   (b) a bell fixedly mounted on said shaft for rotation therewith;
   (c) a supporting disc fixedly mounted within said bell on said shaft for rotation therewith and axially and radially spaced from said bell;
   (d) a stud attached to said disc and offset from the axis of said bell;
   (e) a supporting hub pivotally mounted on said stud;
   (f) a pair of mutually counterbalancing striker heads flexibly mounted on said hub with only one of said heads at a time located in striking relation to said bell, said heads being disposed on opposite sides of said hub; and
   (g) means for limiting the pivoting of said hub to a predetermined range as said hub revolves about the axis of said bell.

3. A vehicular signal alarm for sounding a continuous audible warning of wheel rotation in either direction of wheel travel, comprising:
   (a) a shaft for coaxial rotation with a wheel;
   (b) a bell fixedly mounted on said shaft for rotation therewith;
   (c) a supporting disc fixedly mounted within said bell on said shaft for rotation therewith and axially and radially spaced from said bell;
   (d) a pair of studs attached to said disc and diametrically offset from the axis of said bell; said studs being positioned nearer to the edge of said bell than to said axis;
   (e) a hub pivotally mounted on each of said studs;

(f) a pair of mutually counterbalancing striker heads flexibly mounted on each of said hubs with only one of said heads at a time located in striking relation to said bell, said heads being disposed on opposite sides of each of said hubs and extending outwardly from said hubs at approximately right angles to each other; and (g) means for limiting the pivoting of said hubs to a predetermined range as said hubs revolve about the axis of said bell.

4. A vehicular signal alarm for sounding a continuous audible warning of wheel rotation in either direction of wheel travel, comprising:

(a) a shaft for coaxial rotation with a wheel;

(b) a bell fixedly mounted on said shaft for rotation therewith;

(c) a supporting disc fixedly mounted within said bell on said shaft for rotation therewith and axially and radially spaced from said bell;

(d) a pair of studs attached to said disc and diametrically offset from the axis of said bell, said studs being positioned nearer to the edge of said bell than to said axis;

(e) a hub pivotally mounted on each of said studs;

(f) a pair of mutually counterbalancing striker heads flexibly mounted on each of said hubs with only one of said heads at a time located in striking relation to said bell, said heads being disposed on opposite sides of each of said hubs and extending outwardly therefrom at approximately right angles to each other so that the distance from the edge of the bell to said studs is greater than the distance from said studs to a line passing through the centers of said heads; and (g) means for limiting the pivoting of each of said hubs to a predetermined range as each of said hubs revolves about the axis of said bell.

5. A vehicular signal alarm for sounding a continuous audible warning of wheel rotation in either direction of wheel travel, comprising:

(a) a shaft for coaxial rotation with a wheel;

(b) a bell fixedy mounted on said shaft for rotation therewith;

(c) a supporting disc fixedly mounted within said bell on said shaft for rotation therewith and axially and radially spaced from said bell;

(d) a pair of studs attached to said disc and diametrically offset of the axis of said bell, said studs being positioned nearer the edge of said bell than to said axis;

(e) a hub pivotally mounted on each of said studs, each said hub being eccentrically mounted so that the greater mass of its weight is between the stud and the edge of said bell;

(f) a pair of mutually counterbalancing striker heads flexibly mounted on each of said hubs with only one of said heads at a time located in striking relation to said bell, said heads being disposed on opposite sides of said hubs and extending outwardly therefrom at approximately right angles to each other so that the distance from the edge of said bell to said studs is greater than the distance from said studs to a line passing through the centers of said heads; and (g) means for limiting the pivoting of each of said hubs to a predetermined range as each of said hubs revolves about the axis of said bell.

References Cited in the file of this patent

UNITED STATES PATENTS

| | | |
|---|---|---|
| 391,108 | Atkinson | Oct. 16, 1888 |
| 888,725 | Moore | May 26, 1908 |
| 952,129 | Moore | Mar. 15, 1910 |
| 1,226,010 | Rockwell | May 15, 1917 |
| 2,843,075 | Geraghty | July 15, 1958 |